US009838888B2

(12) United States Patent
Lihosit et al.

(10) Patent No.: US 9,838,888 B2
(45) Date of Patent: Dec. 5, 2017

(54) NETWORK DIAGNOSTIC APPLICATIONS

(71) Applicant: T-Mobile U.S.A., Inc., Bellevue, WA (US)

(72) Inventors: Christopher August Lihosit, Seattle, WA (US); Tyler Blair Axdorff, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/802,894

(22) Filed: Jul. 17, 2015

(65) Prior Publication Data
US 2016/0255513 A1 Sep. 1, 2016

Related U.S. Application Data

(60) Provisional application No. 62/126,385, filed on Feb. 27, 2015.

(51) Int. Cl.
*H04M 3/00* (2006.01)
*H04W 24/02* (2009.01)
*H04W 64/00* (2009.01)
*H04W 24/06* (2009.01)

(52) U.S. Cl.
CPC .......... *H04W 24/02* (2013.01); *H04W 24/06* (2013.01); *H04W 64/006* (2013.01)

(58) Field of Classification Search
None
See application file for complete search history.

(56) References Cited

U.S. PATENT DOCUMENTS

| 5,987,306 A | 11/1999 | Nilsen et al. |
| 8,578,020 B2 | 11/2013 | Van Den Bogaert et al. |
| 8,818,329 B2 * | 8/2014 | Udeshi .............. H04W 52/0258 370/328 |
| 8,825,042 B2 | 9/2014 | Mitchell et al. |
| 2007/0178843 A1 | 8/2007 | Singh et al. |

(Continued)

FOREIGN PATENT DOCUMENTS

WO 2006077283 A1 7/2006

OTHER PUBLICATIONS

International Searching Authority, International Search Report and Written Opinion, PCT Patent Application PCT/US2016/019662, mailed Jul. 20, 2016, 9 pages.

(Continued)

*Primary Examiner* — German J Viana Di Prisco
(74) *Attorney, Agent, or Firm* — Perkins Coie LLP

(57) ABSTRACT

Systems and methods for network diagnostics are provided. Various embodiments allow for a diagnostic application to be automatically pushed to one or more mobile devices on a network. A diagnostic platform can select one or more mobile devices to perform a set of tests (e.g., Wi-Fi connections, cellular connections, download speeds, initiate phone calls, etc.) to evaluate the network performance. The diagnostic application can then be accessed (or installed) by the diagnostic platform. Messages that include the captured data about the network performance can be sent from each of the mobile devices to the diagnostic platform. Various analytics can then be generated about the network and performance of specific device configurations.

20 Claims, 7 Drawing Sheets

(56) References Cited

U.S. PATENT DOCUMENTS

| | | | |
|---|---|---|---|
| 2007/0232289 A1* | 10/2007 | Tatman | H04W 28/18 |
| | | | 455/423 |
| 2008/0201109 A1 | 8/2008 | Zill et al. | |
| 2009/0098868 A1 | 4/2009 | Cheng | |
| 2010/0020717 A1 | 1/2010 | McGregor et al. | |
| 2013/0114446 A1* | 5/2013 | Liu | H04W 24/10 |
| | | | 370/252 |
| 2013/0263260 A1 | 10/2013 | Mahaffey et al. | |
| 2013/0279354 A1 | 10/2013 | Ekman et al. | |
| 2013/0303118 A1 | 11/2013 | Asandului et al. | |
| 2014/0141788 A1* | 5/2014 | Puthenpura | H04W 16/18 |
| | | | 455/449 |
| 2014/0195864 A1 | 7/2014 | Dempski et al. | |
| 2014/0200016 A1* | 7/2014 | Siomina | H04W 24/08 |
| | | | 455/450 |
| 2014/0259179 A1* | 9/2014 | Leppanen | G06F 21/62 |
| | | | 726/27 |
| 2015/0023180 A1* | 1/2015 | Feng | H04W 24/08 |
| | | | 370/241.1 |
| 2015/0031308 A1* | 1/2015 | Schmidt | H04W 76/02 |
| | | | 455/67.11 |
| 2016/0105807 A1* | 4/2016 | Yadav | H04W 24/10 |
| | | | 455/456.1 |

OTHER PUBLICATIONS

Federal Communication Commission. "Understanding Wireless Telephone Coverage Areas." Oct. 17, 2014, 4 pages. Accessed <https://www.fcc.gov/guides/understanding-wireless-telephone-coverage-areas>.

* cited by examiner

NETWORK DIAGNOSTIC APPLICATIONS

CROSS-REFERENCE TO RELATED APPLICATIONS

This application claims priority to U.S. Provisional Application Ser. No. 62/126,385 filed Feb. 27, 2015, which is incorporated herein by reference in its entirety for all purposes.

BACKGROUND

Modern mobile electronic devices (such as mobile phones, personal digital assistants, computer tablets, or the like) have become a common part of modern life. These devices increasingly provide advanced computing capabilities along with a variety of other features and options that improve the user's experience with the device. Some common examples of the features and options include cameras, Wi-Fi, SMS and MMS messaging, web browsers, voice/video calling, and GPS capabilities. In addition to these common features and options, modern electronic devices often include operating systems that can run software applications on one or more processors. The software applications can be installed (e.g., by the manufacture, mobile carrier, or by the user) on these devices to perform a variety of specific tasks and/or extend the functionality of the devices.

The software applications may use many of the hardware and other software components of the mobile devices. Moreover, much of the functionality of the software applications and other features of the mobile device are dependent on reliable network connections between the mobile device and base stations (e.g., to establish voice or video calling). Estimating network coverage is a difficult problem as network coverage can vary from location to location and may even be device dependent.

Traditionally, in order to simplify the problem of estimating network coverage, network coverage information has been primarily based on information from the towers. However, individual device experience of the coverage can vary dramatically for a number of reasons. For example, the reliability of the radio connection between the mobile devices and the base stations may be influenced by many factors, such as the distance between the mobile device and the base station, physical obstacles (e.g., buildings), interference or noise from other devices (e.g., other radio transmissions), network capacity, hardware and software configurations (e.g., of the mobile device and the base stations), and other factors. As such, getting an accurate estimate of the network coverage is a difficult problem and new techniques are needed to measure network performance and determine network coverage.

BRIEF DESCRIPTION OF THE DRAWINGS

Embodiments of the present technology will be described and explained through the use of the accompanying drawings in which.

Figure 1:
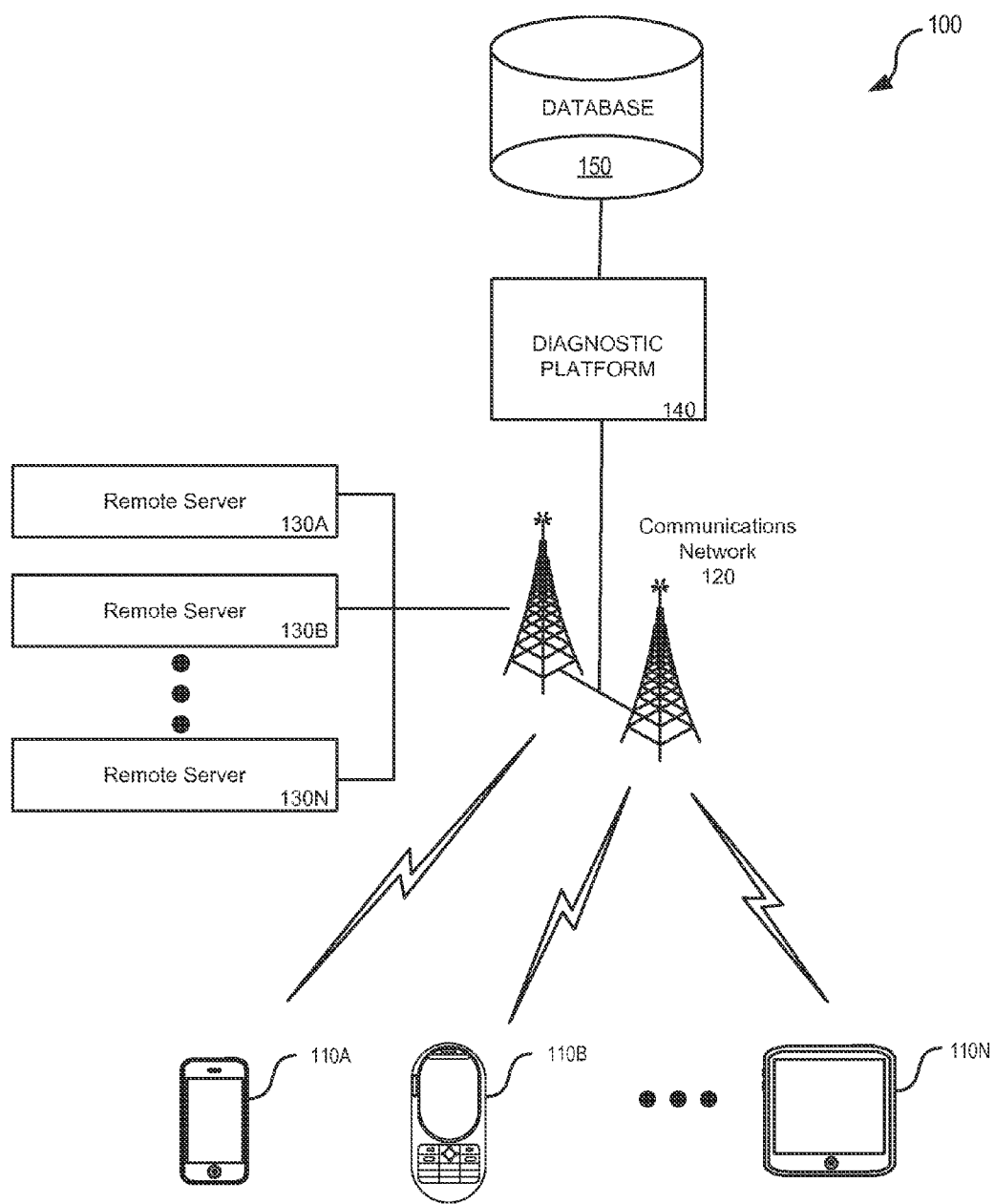
FIG. 1 illustrates an example of a communications environment in which some embodiments of the present technology may be utilized.

The drawings have not necessarily been drawn to scale. For example, the relative sizes of signaling periods in the figures are not to scale, and the size of certain signaling or messaging periods may differ. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Systems and methods for network diagnostics and coverage estimation are described in detail herein. To help diagnose various network problems noted above, and generate more accurate coverage information, various embodiments allow for a diagnostic application to be automatically pushed to an end user's device. The diagnostic application can be pushed to employees and/or to customers to test network coverage for various device configurations and locations. Once installed on the user's device, the application can test Wi-Fi connections, cellular connections, download speeds, initiate phone calls, etc. Location information can be associated with each data set using GPS, accelerometers, magnetometers, and other tools. This information can then be sent back to a server where various analytics can be generated about the network and specific device configurations. This allows for improved real-level network coverage information. For example, the information can be used to generate a map of actual data speeds which can comply with various Federal Communications Commission (FCC) requirements.

Moreover, since various devices and chipsets have different network characteristics (e.g., some radios are better than others), some embodiments of the present technology can be used to determine the optimal (e.g., best performance while minimizing price) chipset to take advantage of the current network infrastructure. As such, a preferred mix of components can be selected so that the mobile device is not over-provisioned (e.g., a more expensive chipset that does not result in significant increase in the user experience). A time-value analysis may be performed to determine if lower-tier or mid-tier components (e.g., baseband processor, radio chip, etc.) provide an acceptable level of experience for the user. Moreover, additional third-party data can be used to design the network infrastructure to improve user experiences. For example, Housing and Urban Development (HUD) data can be used to identify which buildings are going up and their location. This can be used to predict the effect on the network coverage and to select sites for additional towers.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to distributed techniques for measuring network coverage, embodiments of the present technology are equally applicable to various other techniques that utilize real and predicted network experiences and customer behaviors to drive business processes.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 illustrates an example of a communications environment 100 in which some embodiments of the present technology may be utilized. As illustrated in FIG. 1, communications environment 100 may include one or more mobile devices 110A-110N (such as a mobile phone, tablet computer, mobile media device, mobile gaming device, vehicle-based computer, wearable computing device, etc.), communications network 120, remote servers 130A-130N, diagnostic platform 140, and one or more databases 150. As described in more detail below in FIG. 2, to allow a user to make use of the various services and features of the mobile device, mobile devices 110A-110N can include various sensors and input/output components.

In addition, mobile devices 110A-110N can include network communication components that enable the mobile devices to communicate with remote servers 130A-130N or other portable electronic devices by transmitting and receiving wireless signals using licensed, semi-licensed or unlicensed spectrum over communications network 120. In some cases, communications network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Communications network 120 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network.

Those skilled in the art will appreciate that various other components (not shown) may be included in mobile device 110A-110N to enable network communication. For example, a mobile device may be configured to communicate over a GSM mobile telecommunications network. As a result, the mobile device may include a Subscriber Identity Module (SIM) card that stores an International Mobile Subscriber Identity (IMSI) number that is used to identify the mobile device on the GSM mobile communications network or other networks (e.g., those employing 3G and/or 4G wireless protocols). If the mobile device is configured to communicate over another communications network, the mobile device may include other components that enable it to be identified on the other communications networks.

In some embodiments, mobile devices 110A-110N may include components that enable them to connect to a communications network using Generic Access Network (GAN) or Unlicensed Mobile Access (UMA) standards and protocols. For example, a mobile device may include components that support Internet Protocol (IP)-based communication over a Wireless Local Area Network (WLAN) and components that enable communication with the telecommunications network over the IP-based WLAN. Mobile devices 110A-110N may include one or more mobile applications that need to transfer data or check-in with remote servers 130A-130N.

Diagnostic platform 140 can be used to manage the collection of network coverage data, diagnose various network problems, generate various device and network analytics, and generate more accurate coverage information. In accordance with various embodiments, diagnostic platform 140 uses mobile devices on network 120 as a distributed network of sensors to evaluate device level network experiences. Diagnostic platform 140 may supply a diagnostic application to the mobile devices as well as collect data from various other sources about network performance and utilization. Once installed on the user's device, the diagnostic application can test Wi-Fi connections, cellular connections, download speeds, initiate phone calls, etc. This information can then be sent back to diagnostic platform 140 where various analytics can be generated about the network and specific device configurations.

As illustrated in FIG. 1, diagnostic platform 140 can be communicably coupled to one or more databases 150 such as a customer database and/or an analytics database. These databases can have a variety of information that can be utilized by diagnostic platform 150. For example, a customer database can include account information for members of a carrier. Example of such data include, but are not limited to, name, phone number, home address, work address, device information, wireless plan, data plan, and other information. An analytics database can be used to store various diagnostic data in various formats (e.g., raw data, processed data, bundled data, linked data, etc.) In some embodiments, these two databases can be integrated into one database.

Mobile devices 110A-110N may be traveling at a variety of different speeds (e.g., with the user walking or riding in a car). The diagnostic application may record the speed of travel of mobile devices 110A-110N. This information about the travel methodology can be used to modify the tests being performed or as part of the analysis of the data. For example, a user could be walking through park and keeps experiencing dropped calls or other performance issues. This may be occurring due to poor handover between base stations due to the slow traveling speed of the mobile device or some other reason. As such, understanding the travel methodology of the mobile device can be useful in analyzing the data and setting the desired tests for collecting data.

Figure 2:
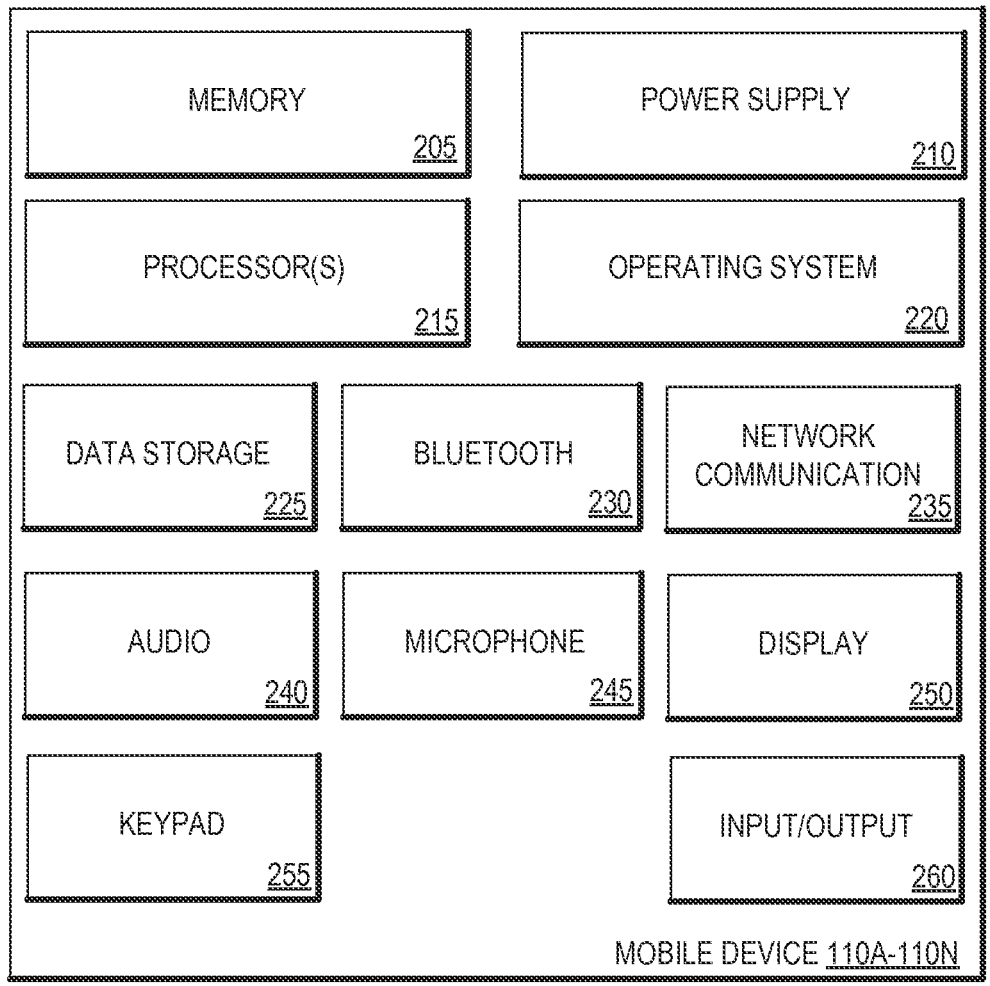
FIG. 2 illustrates a set of components within a mobile device according to one or more embodiments of the present technology.

FIG. 2 illustrates a set of components within mobile device 110A-110N according to one or more embodiments of the present technology. As shown in FIG. 2, mobile device 110A-110N may include memory 205 (e.g., volatile memory and/or nonvolatile memory), power supply 210 (e.g., battery), processor(s) 215 for executing processing instructions, and operating system 220. Additional components such as data storage medium component 225 (e.g., hard drive, flash memory, memory card, etc.), one or more network interfaces (e.g., Bluetooth Interface 230; and Network Communication Interface 235, which enables the mobile phone to communicate by transmitting and receiving wireless signals using licensed, semi-licensed or unlicensed spectrum over a telecommunications network), audio interface 240, microphone 245, display 250, keypad or keyboard 255, and other input and/or output interfaces 260. The various components of a mobile device may be interconnected via a bus.

Processor(s) 215 are the main processors of mobile device 110A-110N which may include application processors, baseband processors, various coprocessors, and other dedicated processors for operating mobile device 110 A-110N. For example, an application processor can provide the processing power to support software applications, memory management, graphics processing, and multimedia. An application processor may be communicably coupled with memory 205 and configured to run the operating system, the user interface, and the applications stored on memory 205 or data storage component 225. A baseband processor may be configured to perform signal processing and implement/manage real-time radio transmission operations of mobile device 110. These processors, along with the other components, may be powered by power supply 210. The volatile and nonvolatile memories found in various embodiments may include storage media for storing information such as processor-readable instructions, data structures, program modules, or other data. Some examples of information that may be stored include basic input/output systems (BIOS), operating systems, and applications, including the diagnostic application described herein.

Figure 3:
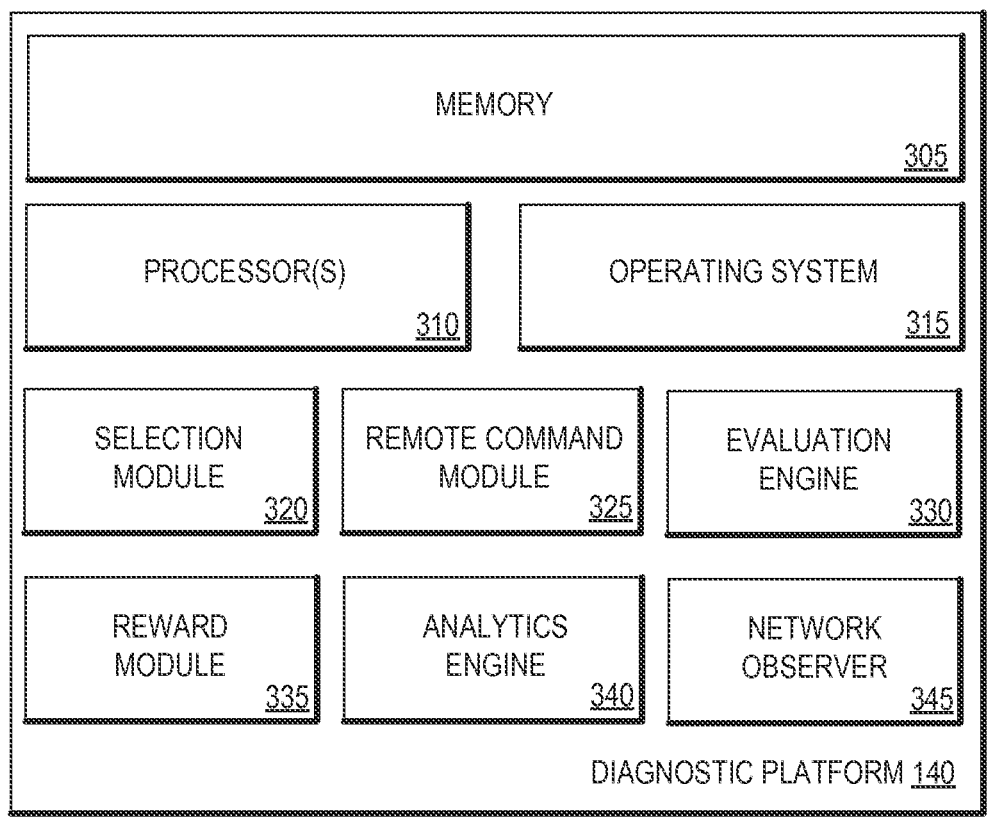
FIG. 3 illustrates a set of components within a diagnostic platform according to one or more embodiments of the present technology.

FIG. 3 illustrates a set of components within diagnostic platform 140 according to one or more embodiments of the present technology. According to the embodiments shown in FIG. 3, diagnostic platform 140 can include memory 305, one or more processors 310, operating system 315, selection module 320, remote command module 325, evaluation engine 330, reward module 335, analytics engine 340, and network observer 345. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, analytics engine 340 and network observer 345 can be combined into a single module for generating analytics and processing information about a communications network.

Memory 305 can be any device, mechanism, or populated data structure used for storing information. In accordance with some embodiments of the present technology, memory 305 can encompass any type of, but is not limited to, volatile memory, nonvolatile memory and dynamic memory. For example, memory 305 can be random-access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 305 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 305.

Memory 305 may be used to store instructions for running one or more applications or modules on processor(s) 310. For example, memory 305 could be used in one or more embodiments to house all or some of the instructions needed to execute the functionality of operating system 315, selection module 320, remote command module 325, evaluation engine 330, reward module 335, analytics engine 340, network and/or observer 345. Operating system 315 provides a software package that is capable of managing the hardware resources of diagnostic platform 140. Operating system 315 can also provide common services for software applications running on processor(s) 310.

Selection module 320 can select one or more mobile devices for evaluating network performance. The mobile devices may be selected based on a variety of factors. In some embodiments, the mobile device of a customer or an employee may be randomly selected to perform network diagnostics. This type of selection may provide a good general overview of the network connections and reliability. As such, once a network profile is created from a random selection, selection module 320 can select additional mobile devices to refine the network profile or retest certain locations.

In some embodiments, one or more notices may be received (e.g., automatically generated notices from mobile devices) that indicate potential network problems (e.g., dropped calls, slow data speeds, poor call quality, etc.) in a geographic location. Alternatively or additionally, the notices may be from customer complaint calls or texts that the service provider has received. Selection module 320 may use various registration records to identify mobile devices currently accessing the wireless network through base stations around or near the geographic location identified as having a potential problem. Selection module 320 could then further refine the selection of mobile devices by identifying current trajectories of the mobile device (e.g., moving 50 miles per hour down an interstate) to predict devices which are likely to pass through or near the geographic area.

Similarly, selection module 320 may identify (e.g., by accessing a customer database having stored thereon multiple customer profiles) mobile devices registered to customers with home addresses or work addresses that are near the geographic location. As another example, a company (e.g., a wireless carrier) may impose as a condition of a use of a mobile device provided by the company to an employee that the device can be used to perform diagnostics. Selection module 320 may select various devices based on employee location, expected mobile device location, device type, hardware configurations of the mobile device, software configurations of the mobile device, denial records, reward records, and/or other factors.

Remote command module 325 provides a framework for generating and processing the commands for installing and operating the diagnostic application on the one or more mobile devices. For example, the framework may include a variety of commands including, but not limited to, download, dialog, install, uninstall, enable, disable, delete, notify, update, user-defined, and the like. In accordance with various embodiments, these commands can be used to cause the mobile device to install, update, and operate the diagnostic application without taking control of the entire device (e.g., the device is not being managed by the diagnostic platform).

Evaluation engine 330 can be configured to determine a set of tests that a diagnostic application should perform, a location where each test in the set of tests should be performed, and/or a frequency at which each test in the set of tests should be performed. The set of tests can include tests for data connections, voice connections, Wi-Fi calling, short message service (SMS), or voice over long term evolution (VoLTE). The frequency may be a nominal frequency that can increase or decrease as test results are processed. The frequency of the diagnostic test can increase (e.g., based on geolocation) as the user gets close to the trouble zone to gather more data. As another example, the frequency may increase if connection did not connect successfully or satisfactorily. In some embodiments, the frequency may be based on length of trial. For a full day network evaluation may include tests that are scheduled between one to ten minutes. As another example, an hour long network evaluation may include tests that are scheduled thirty seconds or more apart.

Reward module 335 can be configured to select one or more rewards or incentives to offer each customer associated with the one or more mobile devices identified by selection module 320 in exchange for allowing the diagnostic application to evaluate the network performance. Examples of the types of incentives include, but are not limited to, statement credits, gift cards, device upgrades, cloud storage space, and the like. In accordance with some embodiments, reward module 335 can select rewards, based at least in part, on an estimated amount of resources the diagnostic application will utilize on the one or more mobile devices.

In various embodiments, selection module 320 may assign a priority (e.g., based on device configuration, home address, work address, etc.) to the mobile devices identified for evaluating network performance. Reward module 335 can use this priority in selecting rewards for the customers so that owners of the mobile devices assigned a higher priority are more likely to install the application. Still yet, in some embodiments, rewards module 335 may select a reward based on other factors or conditions such as, but not limited to, owner profiles, historical willingness to allow testing, perceived inconvenience, and the like.

Analytics engine 340 can be configured to analyze the data regarding the network performance that is received from the various mobile devices. Analytics engine 340 can then generate various analytics about the network and specific device configurations to allow for improved real-level network coverage information. In some embodiments, analytics engine can generate performance analytics of various hardware and software configurations. As such, a preferred mix of components can be selected so that the mobile device is not over-provisioned (e.g., a more expensive chipset that does not result in significant increase in the user experience). A time-value analysis may be performed to determine if lower-tier or mid-tier components (e.g., baseband processor, radio chip, etc.) provide an acceptable level of experience for the user.

Analytics engine 340 may also utilize additional information such as data collected from various network components (e.g., network towers) using network observer 345. Moreover, analytics engine 340 may use additional third-party data to help analyze the network infrastructure to improve user experiences. For example, Housing and Urban Development (HUD) data can be used to identify which buildings are going up and their location. This can be used to predict the effect on the network coverage and to select sites for additional towers.

Figure 4:
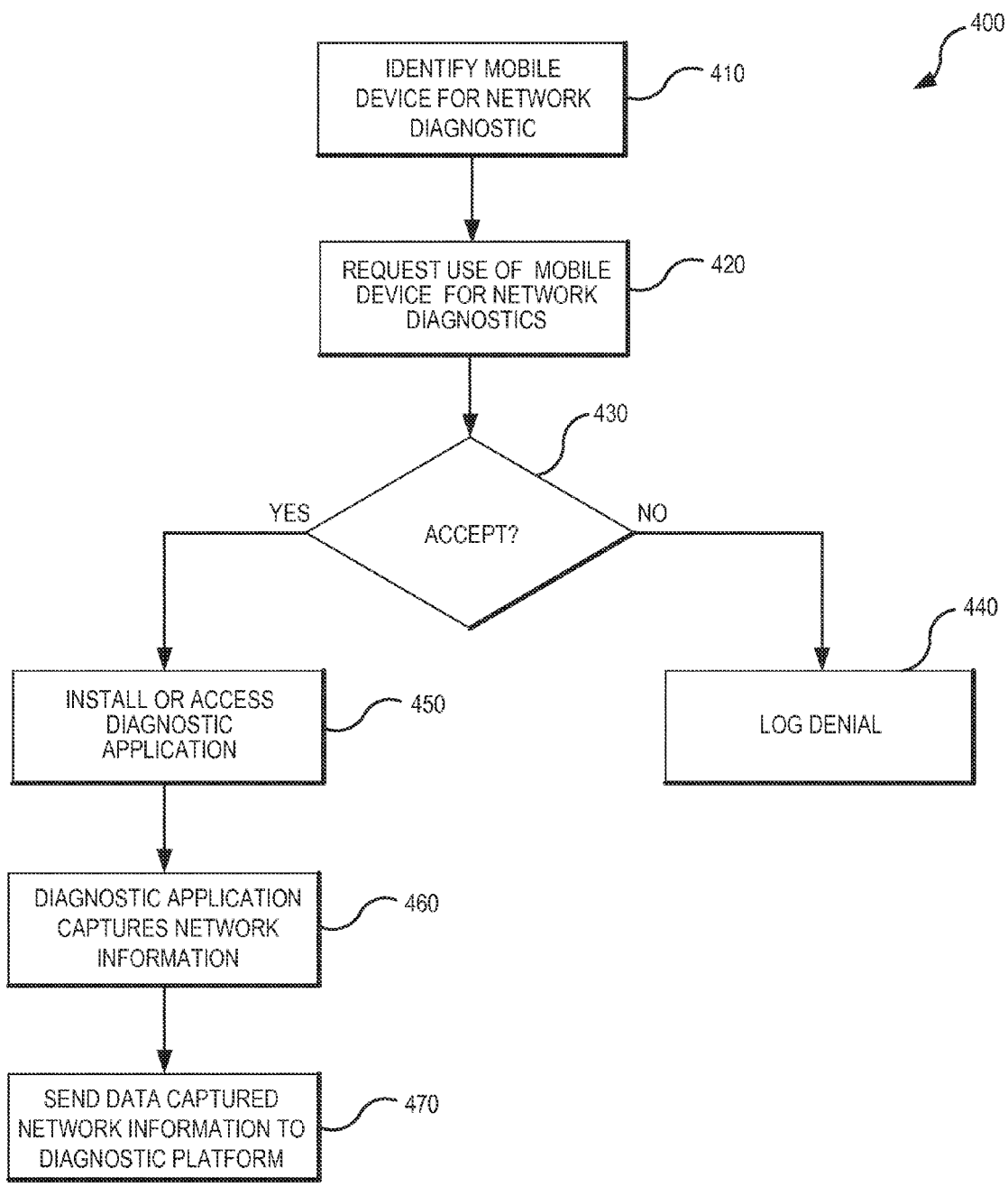
FIG. 4 is a flowchart illustrating a set of operations for capturing network information in accordance with some embodiments of the present technology.

FIG. 4 is a flowchart illustrating a set of operations 400 for operating a diagnostic platform in accordance with some embodiments of the present technology. The operations illustrated in FIG. 4 can be performed by diagnostic platform 140 and/or one or more components (e.g., processor), engines, and/or modules (e.g., selection module 320) associated with diagnostic platform 140. As illustrated in FIG. 4, identification operation 410 identifies a mobile device to perform a network diagnostic. The mobile device identified by identification operation 410 may be a single device or part of a larger group of devices.

In some embodiments, the device of a customer or an employee may be randomly selected to perform network diagnostic at a randomly selected time. This type of selection may provide a good general overview of the network connections and reliability. More specific selection processes could be used based on the analysis of this information or after one or more triggering events. For example, additional devices and times may be selected to fill in gaps in the diagnostic coverage testing or to retest certain area after an equipment change.

In some embodiments, a customer may indicate that they are having problems (e.g., dropped calls, slow data speeds, poor call quality, etc.) with the network at a particular location and/or time of day. This may occur, for example, with a call to a customer representative, via e-mail, automatically from the mobile device, or via a submission through a graphical user interface. Using the information about the customer and/or device, identification operation 410 can identify the mobile device(s) that should be used for diagnostics. The mobile devices identified for testing may or may not include the mobile device of the customer.

As another example, a company (e.g., a wireless carrier) may impose as a condition of a use of a mobile device provided by the company to an employee that the device can be used to perform diagnostics. Identification operation 410 may select various devices based on employee location, expected mobile device location, device type, hardware configurations of the mobile device, software configurations of the mobile device, denial records, reward records, and/or other factors.

Once identification operation 410 identifies a mobile device for network diagnostics, request operation 420 generates a request for the use of the mobile device to perform diagnostics. This request may be presented to the user in a variety of manners. For example, the request may be presented through a mobile application, via a call with a customer representative, a text message, or other channel. In some cases, the request may not even need to be presented to the user of the mobile device (e.g., if the user has already agreed to such activities). In addition, the request may notify the user of the potential impact on battery or other mobile operations and encourage them to keep the phone plugged in, minimize use, etc. while the diagnostic application is running. The request may also notify the user that the user will not be charged for any of the transmission originating as the result the diagnostics or that the user may be whitelisted in a billing database to ensure they are not charged.

Determination operation 430 determines if the request is accepted (e.g., via a response from the user). If determination operation 430 determines that the request was not accepted, then determination operation 430 branches to log operation 440 where the denial is logged. While not illustrated in FIG. 4, in some embodiments, a reward or incentive may be offered in response to a denial to entice acceptance of the request for the use of the mobile device to perform diagnostics on the network.

If determination operation 430 determines that the request was accepted, then determination operation 430 branches to access operation 450 where the diagnostic application is installed and accessed. In some embodiments, access operation 450 may first install the application if necessary and then launch the application. For example, in various embodiments, the remote command and control framework supported by the diagnostic application may be able to send commands to install or launch the application without controlling the entire device (e.g., the device may not be managed by an enterprise).

During capture operation 460, the diagnostic application can capture a variety of information about the network coverage that the mobile device is currently experiencing. For example, the diagnostic application may test data connections (receiving and sending data), voice connections, Wi-Fi calling, SMS messaging, VoLTE calling, and other types of coverage. The application can then send the captured network information to the diagnostic platform during transmission operation 470. In some embodiments, the captured network information may include the raw data, locally scored or ranked results, third-party test identifiers (to identify results/data held by third parties), and/or other types of information.

Figure 5:
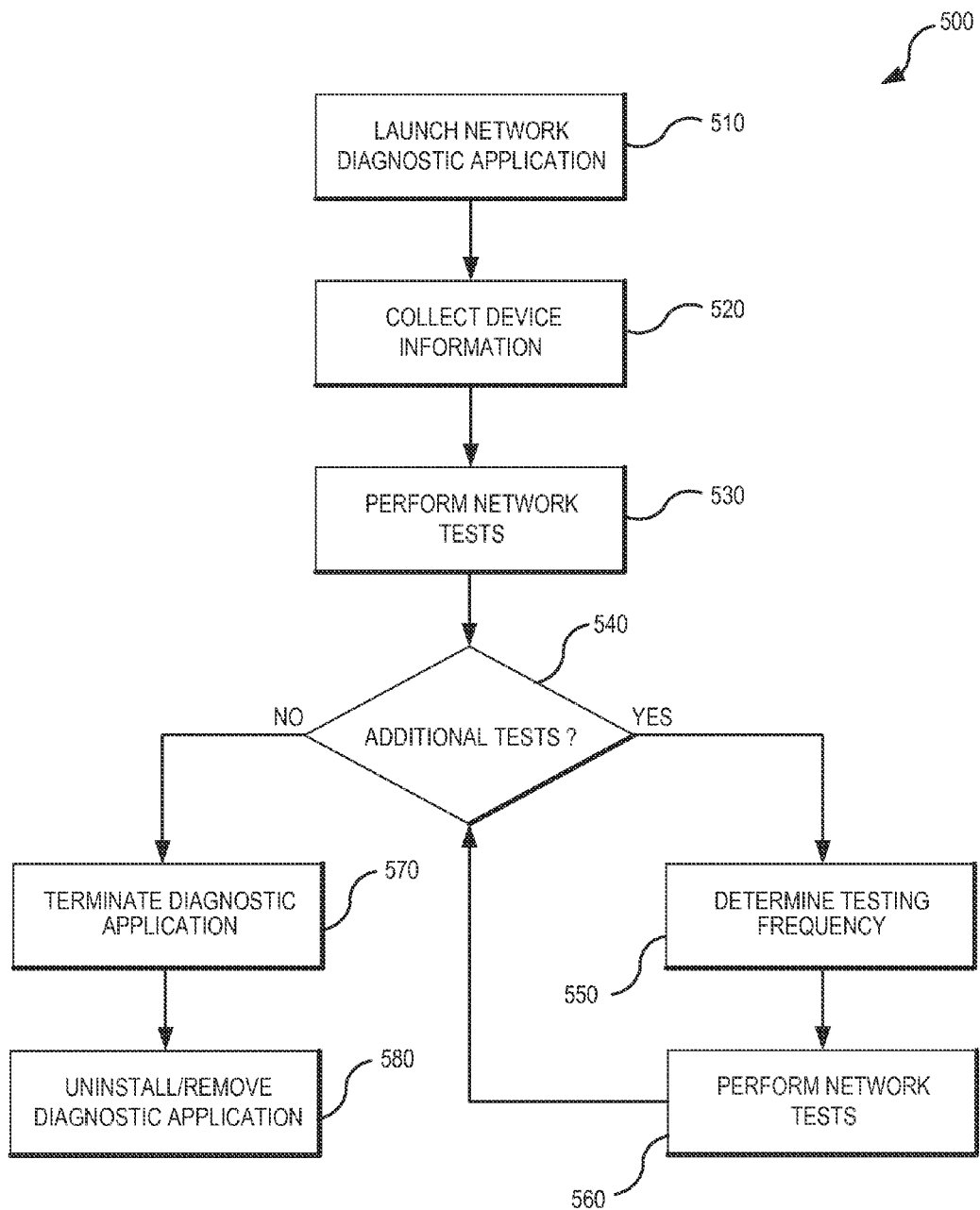
FIG. 5 is flowchart illustrating a set of operations for operating a diagnostic application in accordance with one or more embodiments of the present technology.

FIG. 5 is flowchart illustrating a set of operations 500 for operating a diagnostic application in accordance with one or more embodiments of the present technology. The operations illustrated in FIG. 5 can be performed by a mobile device or one or more components (e.g., processor(s) 215), engines, applications, and/or modules associated with the mobile device. As illustrated in FIG. 5, diagnostic operation 510 launches the diagnostic application. Diagnostic operation 510 may be triggered in a variety of ways. For example, the trigger may be an event trigger, a timed scheduled trigger, a location-based trigger, and the like. In some embodiments, the trigger may be deployed in response to a request from a third-party (e.g., a customer care representative). This could be, for example, in response to a call from a user of the mobile device that is complaining of performance issues. The customer care representative could set the diagnostic application to perform a variety of diagnostics in the particular area, time of day, etc. that the user has identified the performance issued.

During collection operation 520, a variety of device information may be collected about the mobile device. For example, the device information collected may include the make and/or model of the mobile device, the MZ version, type allocation code (i.e., first eight digits of the 15-digit IMEI and 16-digit IMEISV), location (e.g., using GPS), mobile device acceleration information (e.g., from accelerometers), magnetometer readings, current weather data, and/or other data identifying information that may affect performance of the mobile device. Collection operation 520 may also collect information about the various network connections and perceived strength that is available.

Once the information is collected, testing operation 530 can cycle through a variety of selected tests. For example, testing operation 530 may test data connections (e.g., does the data connection stay live and at what speeds), voice connections, Wi-Fi calling, SMS, VoLTE, etc. In some embodiments, various third-party services may be used as part of the testing process. For example, to test a voice connection, a third-party service (e.g., twilio.com) may be used to test connection quality by automatically presenting various prompts and/or pre-recorded messages. The application could also have a set of pre-recorded tones and/or messages that can be used during call out to a particular service. Once the service picks up, the pre-recorded tones can be played and then analyzed (e.g., using a Fourier Transform or Fast Fourier Transform) to identify the signal frequency and other quality measures to determine voice quality. This analysis can be transmitted back to the phone or to diagnostic platform 140.

Once testing operation 530 is complete, decision operation 540 determines whether additional tests are needed. If determination operation 540 determines that additional tests are needed, then decision operation 540 branches to selection operation 550 where the additional tests are identified along with a frequency (e.g., every ten minutes for the next hour) and then executed by performance operation 560. The frequency and length of each test may be configurable based on length of the trial.

In some embodiments, the frequency may be dependent on various parameters (e.g., location, battery life, etc.). For example, the frequency of the testing may be configured to increase as the mobile device gets close to a trouble zone. As a result, the device may gather more data around this trouble area. In some embodiments, the frequency may also be increased if connection did not complete successfully. As another example, a nominal frequency may be assigned during selection operation 550. The frequency may be decreased over this period when connections are fine over several checks and when the location of the mobile device has not shifted significantly enough to believe that the network conditions were likely to have changed.

Performance operation 560 returns to decision operation 540 to determine whether additional tests are needed. If determination operation 540 determines that no additional tests are needed, then decision operation 540 branches to termination operation 570 where the diagnostic application is terminated and possibly removed from the mobile device during removal operation 580.

Figure 6:
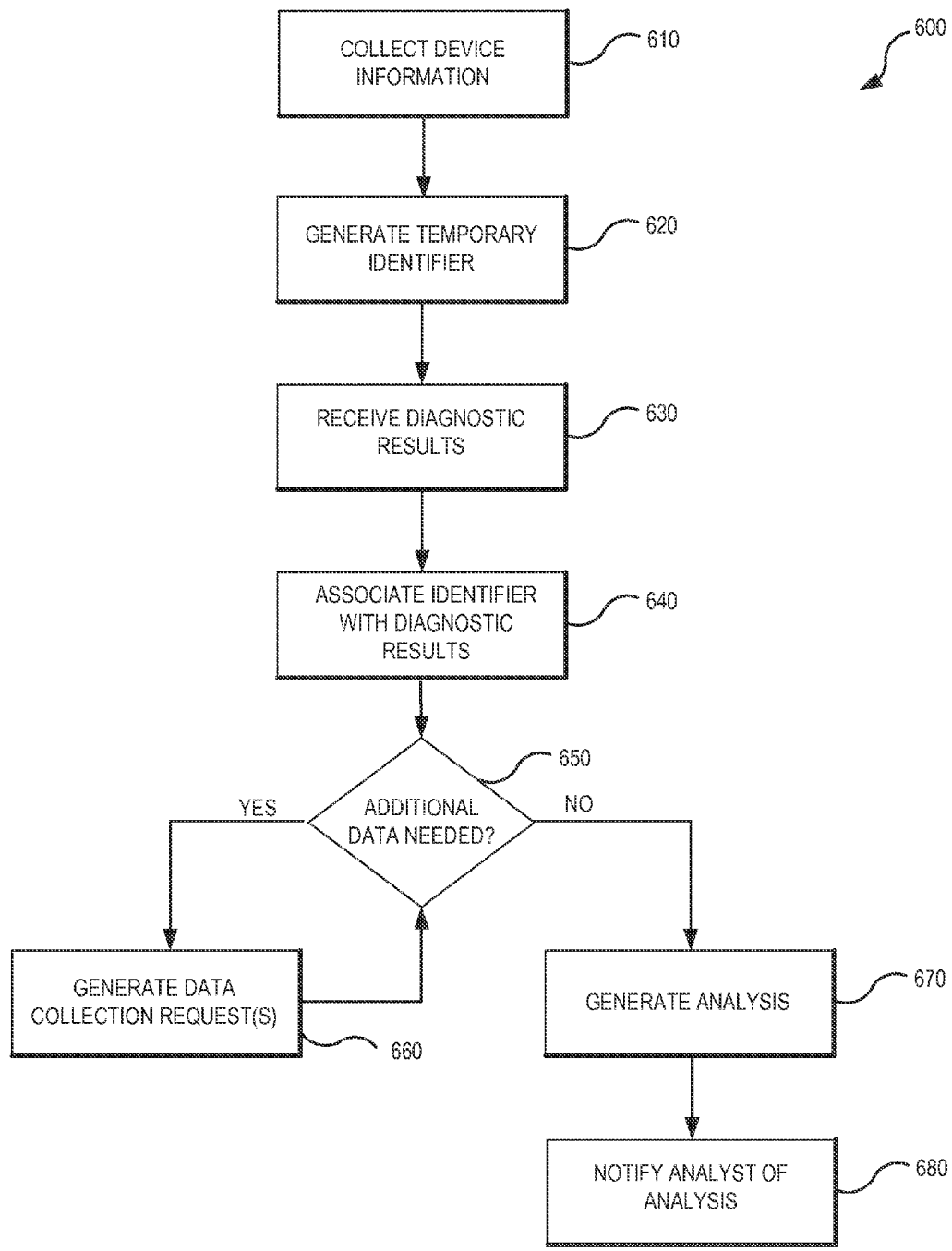
FIG. 6 is a flowchart illustrating a set of operations generating a network analysis in accordance with some embodiments of the present technology.

FIG. 6 is a flowchart illustrating a set of operations 600 for generating a network analysis in accordance with some embodiments of the present technology. As illustrated in FIG. 6, collection operation 610 collects a variety of device information. The information about the device may be collected from the device itself, from a carrier database, or from a third-party service. Examples of the device information collected may include, but are not limited to, information about current connections to various networks, information to identify the hardware and software configuration of the mobile device (e.g., make/model, type allocation code, IMEI, operating system version, etc.), information about the location and movement of the mobile device (e.g., using GPS, accelerometers, etc.), and/or other data identifying information that may affect performance of the mobile device.

Once the device information is collected, identification operation 620 may generate a temporary identifier that can be associated with the data. For example, in some embodiments, the identifier may be a randomly assigned string of characters and numbers. In other embodiments, the identifiers may include a specific format comprised from the type allocation code, year, month, date, time, and/or location). Once the diagnostic results are collected using diagnostic operation 630, association operation 640 can associated the identifier with the diagnostic results.

Determination operation 650 determines if additional data is needed. If determination operation 650 determines that additional data is needed, then determination operation 650 branches to generation operation 660 that generates additional collection requests which are then performed before branching back to determination operation 650. These additional collection requests may be able to change parameters of the diagnostic tests. Examples of the parameters can include, but are not limited to, the tests to be performed, that the mobile device is within a particular geographic area, number of tests, number of times to repeat the test, and the like. If determination operation 650 determines that additional data is not needed, then determination operation 650 branches to analysis operation 670 where the data can be analyzed. Once completed, notification operation 680 notifies an analyst that the results are ready for study.

Figure 7:
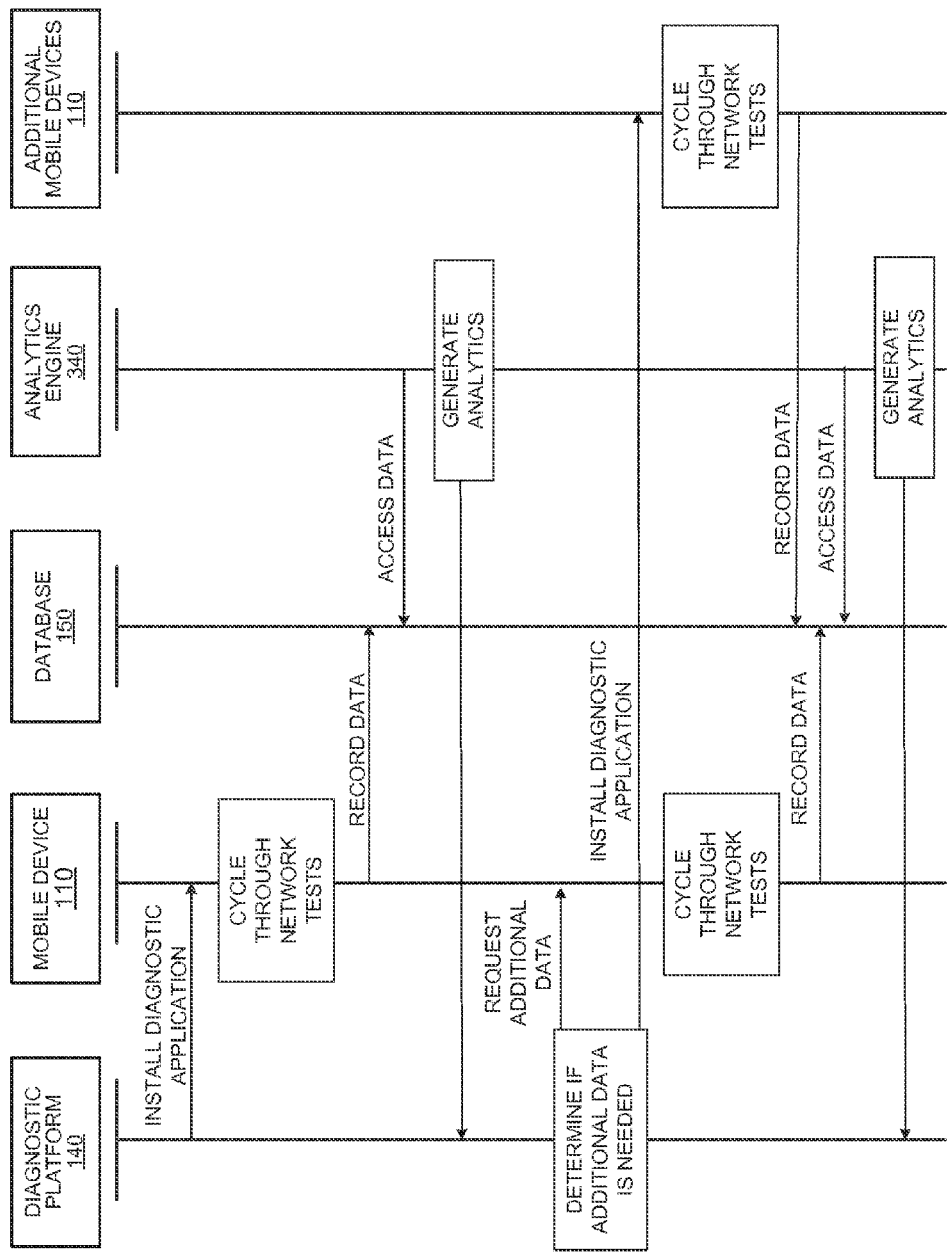
FIG. 7 is a sequence diagram illustrating an example of the data flow between various components of a communications system according to various embodiments of the present technology.

FIG. 7 is a sequence diagram illustrating an example of the data flow between various components of a communications system according to various embodiments of the present technology. As illustrated in FIG. 7, diagnostic platform 140 can install (or access a previously installed) diagnostic application on a mobile device 110. The diagnostic application can cycle through a variety of network test to collect information about the current network experience available to the user. This data can be recorded in database 150 and accessed by analytics engine 340. In accordance with various embodiments, the data and data logs may be transmitted immediately from mobile device 110 to diagnostic platform 140 for recordation in database 150. In some embodiments, the data and data logs may be transmitted at a later time (e.g., when the device is plugged in, connected to Wi-Fi, at off-peak network times, etc.)

Analytics engine 340 can analyze the data recorded from mobile device 110 and generate various analytics regarding the network experience relative to other devices on the network with similar profiles (e.g., location, time of tests, similar devices, etc.). This information can be passed to diagnostic platform 140 where a determination can be made if additional data is needed (e.g., to determine if this is an isolated problem unique to the user, a temporary network issue, or a broader deficiency in the network coverage). Diagnostic platform 140 can request additional data from mobile device 110 and/or from additional mobile devices 110 on the network. Once the data is collected and recorded in database 150, analytics engine 340 can generate additional or updated analytics for review by diagnostic platform 140.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. §112(f) will begin with the words "means for", but use of the term "for" in any other context is not intended to invoke treatment under 35 U.S.C. §112(f). Accordingly, the applicant reserves the right to pursue additional claims after filing this application to pursue such additional claim forms, in either this application or in a continuing application.

What is claimed is:

1. A method for performing a remote network diagnostic using multiple wireless mobile devices, the method comprising:
   selecting one or more mobile devices to perform a set of tests to evaluate performance of a wireless network;
   installing, using remote command and control instructions from a diagnostic
   platform, a diagnostic application on the one or more mobile devices,
   wherein the diagnostic application, once installed, performs the set of tests to evaluate the network performance; and
   receiving, at the diagnostic platform, messages from the diagnostic application that include captured data,
   wherein the captured data includes device specific information identifying hardware and software configurations of the one or more mobile devices, and
   wherein the captured data includes data about the network performance in response to the set of tests used by the diagnostic application to evaluate the network performance as the mobile device moves about a geographic region;
   generating analytics based on the captured data, wherein the analytics identify
   optimal hardware configurations, wherein the optimal hardware configurations include a best performance while minimizing rice for a mobile device's chipset in light of the network performance of the wireless network.

2. The method of claim 1, wherein selecting the one or more mobile devices to perform the set of tests to evaluate network performance further comprises:
   receiving a notice from a user of a first mobile device of the one or more mobile devices that the first mobile device is experiencing poor performance of the wireless network,
      wherein the notice from the user identifies a geographic area where the poor performance of the wireless network was experienced, and
      wherein selecting the one or more mobile devices to perform the set of tests to evaluate network performance includes automatically identifying additional mobile devices that are likely to be in the geographic area; and
   receiving permission from the user of the first mobile device to install the diagnostic application on the first mobile device.

3. The method of claim 1, wherein selecting the one or more mobile devices to perform the set of tests to evaluate network performance further comprises:
   receiving a notice from a user of a first mobile device of the one or more mobile devices that the first mobile device is experiencing poor performance of the wireless network; and
   receiving permission from the user of the first mobile device to install the diagnostic application on the first mobile device.

4. The method of claim 1, wherein selecting the one or more mobile devices to perform the set of tests to evaluate network performance includes selecting one or more mobile devices of employees affiliated with a business organization that controls the wireless network.

5. The method of claim 1, wherein the set of tests to evaluate network performance include a data connection test, a voice connection test, a Wi-Fi calling test, a short message service (SMS) test, or a voice over long term evolution (VoLTE) test, and wherein the method further comprises generating, based on the messages from the diagnostic application, a map of actual data speeds to comply with Federal Communications Commission (FCC) requirements.

6. The method of claim 1, wherein the device specific information identifying hardware or software configurations of the one or more mobile devices includes a make of the one or more mobile devices, a model of the one or more mobile devices, and a type allocation code from the one or more mobile devices.

7. The method of claim 1, wherein the set of tests are schedule to be repeated multiple times at a nominal frequency, and the method further comprising:
   decreasing the nominal frequency when the set of tests indicate the network performance is above a desired threshold; and
   increasing the nominal frequency when the set of tests indicate the network performance is below the desired threshold.

8. The method of claim 1, wherein generating analytics further comprises generating analytics based on the captured data and based on third party data, wherein the analytics identify areas where additional wireless telecommunications infrastructure would improve the wireless network, and wherein the third-party data includes Housing and Urban Development (HUD) data to identify buildings going up at a location, to thereby assist in designing network infrastructure or improve user experiences.

9. A diagnostic platform comprising:
   a memory storing processor-implementable instructions;
   a processor coupled to the memory;
   wherein the processor-implementable instructions stored in the memory perform a method to
   randomly identify multiple mobile devices to evaluate network performance using a diagnostic application;
   apply a set of tests and a location where each test in the set of tests should be performed,
   wherein the set of tests includes a test of a data connection
   receive data regarding the network performance from the multiple mobile devices;
   generate a network performance analysis by analyzing the data regarding the network performance;
   automatically identify, based on the network performance analysis, one or more locations that need additional refinement or a retest;
   request selection of additional mobile devices, based on current geographic location, to perform the additional refinement or retest; and
   generate a recommendation based on results of analyzing the data regarding the network performance, wherein the recommendation can indicate a geographic area in which additional wireless telecommunications infrastructure may be needed; and based on the data regarding the network performance, generate a map of actual data speeds, to thereby comply with Federal Communications Commission (FCC) requirements.

10. The diagnostic platform of claim 9 wherein:
the method determines a frequency at which each test in the set of tests should be performed; and
wherein the set of tests include tests of a voice connection, Wi-Fi calling, short message service (SMS), or voice over long term evolution (VoLTE).

11. The diagnostic platform of claim 9, wherein the method further comprises determining a frequency at which each test in the set of tests should be performed.

12. The diagnostic platform of claim 9, further comprising:
a customer database having stored thereon a customer profile associated with each of the multiple mobile devices; and
wherein the method further comprises selecting one or more rewards to offer each customer associated with the multiple mobile devices in exchange for allowing the diagnostic application to evaluate the network performance, wherein the one or more rewards are selected, based at least in part, on an estimated amount of resources the diagnostic application will utilize on the multiple mobile devices.

13. The diagnostic platform of claim 9, wherein the method further comprises:
retrieving additional data about network performance not collected via the diagnostic application; and
analyzing the additional data about the network performance not collected by the diagnostic application.

14. The diagnostic platform of claim 9, further comprising retrieving additional data about network performance not collected via the diagnostic application.

15. The diagnostic platform of claim 9, further comprising sending remote commands to the multiple mobile devices to install the diagnostic application.

16. At least one non-transitory computer-readable medium, storing computer-executable instructions to perform a remote network diagnostic method using multiple wireless mobile devices, the method comprising:
selecting one or more mobile devices to perform a set of tests to evaluate performance of a wireless network;
installing, using remote command and control instructions from a diagnostic platform, a diagnostic application on the one or more mobile devices, wherein the diagnostic application, once installed, performs the set of tests to evaluate the network performance; and
receiving, at the diagnostic platform, messages from the diagnostic application that include captured data,
wherein the captured data includes device specific information identifying hardware and software configurations of the one or more mobile devices, and
wherein the captured data includes data about the network performance in response to the set of tests used by the diagnostic application to evaluate the network performance as the mobile device moves about a geographic region;
generating analytics based on the captured data, wherein the analytics identify optimal hardware configurations, wherein the optimal hardware configurations include a best performance while minimizing price for a mobile device's chipset in light of the network performance of the wireless network.

17. The at least one non-transitory computer-readable medium of claim 16, wherein selecting the one or more mobile devices to perform the set of tests to evaluate network performance includes selecting one or more mobile devices of employees affiliated with a business organization that controls the wireless network.

18. The at least one non-transitory computer-readable medium of claim 16, wherein the set of tests to evaluate network performance include a data connection test, a voice connection test, a Wi-Fi calling test, a short message service (SMS) test, or a voice over long term evolution (VoLTE) test, and wherein the method further comprises generating, based on the messages from the diagnostic application, a map of actual data speeds to comply with Federal Communications Commission (FCC) requirements.

19. The at least one non-transitory computer-readable medium of claim 16, wherein the device specific information identifying hardware or software configurations of the one or more mobile devices includes a make of the one or more mobile devices, a model of the one or more mobile devices, and a type allocation code from the one or more mobile devices.

20. The at least one non-transitory computer-readable medium of claim 16, wherein generating analytics further comprises generating analytics based on the captured data and based on third party data, wherein the analytics identify areas where additional wireless telecommunications infrastructure would improve the wireless network, and wherein the third-party data includes Housing and Urban Development (HUD) data to identify buildings going up at a location, to thereby assist in designing network infrastructure or improve user experiences.

* * * * *